May 1, 1951     M. E. CHRISTENSEN ET AL     2,550,773

SHOCK-RESISTANT, PUNCTURE-SEALING TIRE

Filed Aug. 31, 1946

INVENTOR.
Manford E. Christensen and William J. Hanson
BY Robert J. Leahy
ATTORNEY.

Patented May 1, 1951

2,550,773

UNITED STATES PATENT OFFICE 2,550,773

SHOCK-RESISTANT, PUNCTURE-SEALING TIRE

Manford E. Christensen and William J. Hanson, Racine, Wis.

Application August 31, 1946, Serial No. 694,300

10 Claims. (Cl. 152—346)

This invention relates to the production of an improved tire. More particularly, it relates to a shock-resistant, puncture-sealing pneumatic tire.

Heretofore various attempts have been made to construct a puncture-sealing pneumatic tire which would prevent a sharp object directly contacting the tube. Such construction is shown in U. S. Patent 1,501,069.

Other investigators have developed puncture-sealing tubes for use in pneumatic tires. These tubes are either of the compression or self-healing type.

The self-healing type of tubes relies upon the use of a gummy or plastic inner layer in the tube to seal any puncture hole made in the tube. This layer is usually so positioned as to protect the tread portion of the tire, and affords relatively little protection for the sidewalls or rim area.

The compression type tubes resist the passage through the tube wall of a sharp object by squeezing shut any small hole caused by the insertion and withdrawal of a puncturing object. However, these tubes are ineffective in closing large holes in the tube.

Pneumatic tires are constantly being called upon to perform new duties. In the last few years, farm tractors have been almost universally equipped with pneumatic tires. Large earth-moving equipment now is being mounted on rubber tires, and the increasing size of airplanes has brought new problems to the tire manufacturer in providing tires to meet the specific needs.

Many accidents are caused by tire failure, not only in automobiles, but in airplanes as well. This is especially true of blow-outs. The usual puncture-sealing tire or tube affords little protection against this type of accident. Furthermore, the life of a tire could be greatly increased if it might be so constructed as to be puncture-sealing, and in addition shock-resistant.

Briefly, our invention comprises a shock-resistant, puncture-sealing tire having an outer tread and an inner wall. The inner wall includes a plurality of shock-resistant pillars, preferably arranged in layers, and the space between the pillars contain cellular rubber. The pillars are preferably so staggered as to prevent a sharp object from piercing more than one layer without contacting a pillar.

Among the objects of our invention are to provide a tire having a high degree of shock-resistant and puncture-sealing qualities which is adaptable not only for use on automobiles, but also on trucks, airplanes, tractors, and the like; and to provide a tire which can be manufactured efficiently and economically.

These and other objects and advantages will appear more fully in connection with the accompanying drawings in which.

Similar numerals refer to similar parts throughout the several views.

Figures 1, 3, 4:
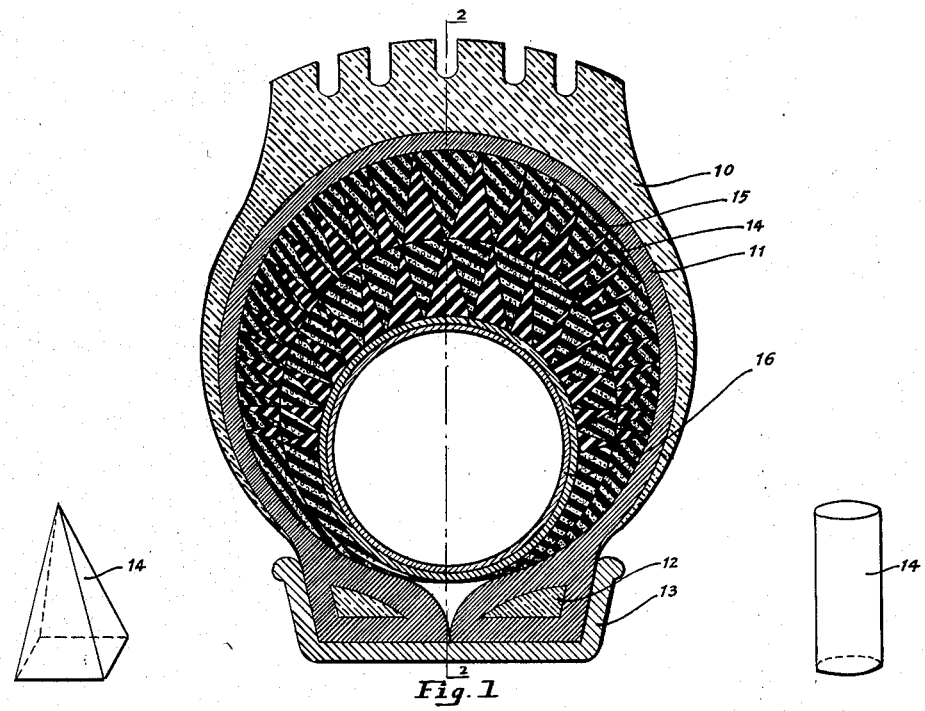
Figure 1 is a fragmentary transverse section through an assembly of a tire and rim and showing one embodiment of our improved tire.
Figure 3 is a perspective view of the pillar of Figure 1.
Figure 4 is a perspective view of another embodiment of the pillar.

Referring especially to Figure 1, it will be seen that one embodiment of our improved tire has a tread 10 which may be constructed with a casing 11 of alternate layers of fabric and rubber or cords and rubber in the usual manner of tire casings, and terminating in reinforcement beads 12 adapted to be held upon a rim 13. Within the tire, and forming a part of the inner wall, are positioned a plurality of pillars 14. The space between the pillars 14 is filled with a cellular rubber 15, preferably foam or sponge rubber. Within the casing 11 is disposed an inner tube 16, of comparatively thin resilient rubber adapted when inflated with air to support the tire casing in the usual manner. However, if desired, the tube may be eliminated without destroying the shock-resistant qualities of our improved tire.

Figure 2:
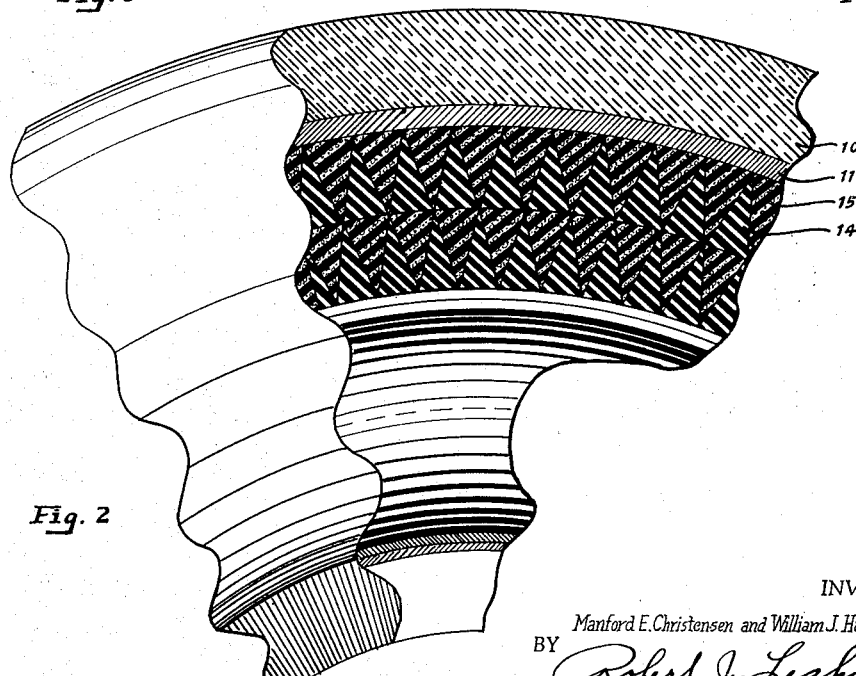
Figure 2 is a side elevational view, partly broken away, taken on the line 2—2 of Figure 1, showing construction of the inner wall in detail.

The pillars 14 are constructed of a resilient material preferably of hard rubber, and may be of a variety of shapes. For example, the shape of the pillars 14 of Figures 1 and 2, and shown in detail in Figure 3 are pyramid shaped. Figure 4 illustrates another type of pillar contemplated by our invention which is a round shaped pillar. Figures 3 and 4 are illustrative only of shapes of pillars operable in this invention, and in no way to be construed as limiting the shape of pillars that may be used. Any shaped pillar desired may be used so long as the pillars afford a resilient, shock-resistant action. While in Figures 1 and 2, the pillars are positioned with their base inward, but if desired, they may be reversed. The pillars may also be joined or tied together by cross-bars of rubber or other material.

The number and size of the pillars will vary according to the size of the tire, and the use for which it is intended. For example, the tire of Figure 1 is for use on a passenger automobile. In this type of tire, generally two layers of pillars will be sufficient to provide both shock-resistant and puncture-sealing protection. The pillars are preferably about as high as the thickness of the tread 10, but, if desired, the number of layers as well as the size of the pillars may be varied. In the preferred construction shown in Figures 1 and 2, the pillars 14 are so staggered as to prevent a sharp object from piercing more than one layer without contacting a pillar. Furthermore, in this preferred embodiment of our invention, the size of the pillars are increased as the layers progress inwardly; e. g. the pillars in the layer nearest the tread 10 are smallest, and in the next layers the pillars are larger, and increase in size as the layers progress inwardly. By staggering the pillars, a framework of resilient, shock-resistant material is afforded which gives increased strength and shock-resistance over a construction wherein the pillars 14 are arranged in a vertical manner. But, the arrangement of pillars 14 other than staggered is also contemplated by our invention.

The filling of the spaces between the pillars 14 with cellular rubber 15, provides added resiliency to the pillars 14 in assisting the pillars to return to their normal shape after having been distorted by the tire coming in contact with a sharp object. In addition, the cellular rubber affords an excellent puncture-sealing medium which squeezes shut any small hole made by the insertion and withdrawal of a sharp object.

The pillars 14 may be moulded integral with the tire, or may be built into a conventional casing. The pillars may be cemented to the casing, or inside wall, or the pillars may be vulcanized to the casing. The cellular rubber, for example foam rubber, may be cemented into the spaces, or affixed in any other conventional manner. A convenient method of constructing the improved inner wall is to apply the pillars and cellular rubber between two strips of rubber, plastic or fabric, and the desired number of layers of pillars thus prepared may be easily cemented into the inside of the casing 11. Other methods of constructing our improved tire will readily occur to those skilled in the rubber art.

While the illustrated embodiment of our invention is for a shock-resistant, puncture-sealing automobile tire, this invention is equally adapted for the construction of heavy duty tires, such as airplane tires, tractor tires, truck tires, and the like.

In an airplane tire, a tire having shock-resistant qualities is particularly desired, as the impact of the tire in landing is severe. The failure of ordinary tires to withstand this severe treatment is a cause of many accidents. Our improved tire with its built-in shock-resistant construction, will afford additional protection against this cause of tire failure.

Likewise, our tire will afford not only puncture-sealing protection in tires, but will in addition, provide a built-in shock-resistant construction to afford protection against blow-outs, stone bruises, and the like. The improved tire is of high efficiency and reliability, and can be cheaply and economically produced.

Many apparently widely different embodiments of this invention may be made without departing from the principle, breadth and spirit thereof, and it is to be understood, therefore, that this invention is not limited to the specific embodiments thereof except as encompassed by the following claims.

We claim:

1. A shock-resistant, puncture-sealing tire comprising an outer tread and an inner wall, said inner wall including a plurality of layers of shock-resistant pillars, the spaces between said pillars containing cellular rubber, each pillar of a relatively radially inner layer being so arranged as to lie radially inwardly of a cellular rubber area of a relatively radially outer layer.

2. A shock-resistant, puncture-sealing tire comprising an outer tread and an inner wall, said inner wall including a plurality of pyramid shaped pillars, the spaces between said pillars containing cellular rubber, each pillar of a relatively radially inner layer being so arranged as to lie radially inwardly of a cellular rubber area of a relatively radially outer layer.

3. A shock-resistant, puncture-sealing tire comprising an outer tread and an inner wall, said inner wall including a plurality of round pillars, the spaces between said pillars containing cellular rubber, each pillar of a relatively radially inner layer being so arranged as to lie radially inwardly of a cellular rubber area of a relatively radially outer layer.

4. A shock-resistant, puncture-sealing tire comprising an outer tread and an inner wall, said inner wall including a plurality of layers of pyramid shaped rubber pillars, the spaces between said pillars being filled with foam rubber, the apices of the pillars of alternate layers lying directly beneath and radially inwardly of the apices of the foam rubber areas while the bases of said pyramidal-shaped pillars of each layer abut each other.

5. A shock-resistant, puncture-sealing tire comprising an outer tread and an inner wall, said inner wall including a plurality of layers of rubber pillars, the spaces between said pillars being filled with foam rubber, the pillars being of harder rubber than foam rubber, each pillar of a relatively radially inner layer being so arranged as to lie radially inwardly of a foam rubber area of a relatively radially outer layer.

6. A shock-resistant, puncture-sealing tire comprising an outer tread and an inner wall, said inner wall including a plurality of layers of pillars, the spaces between said pillars being filled with foam rubber, each pillar of a relatively radially inner layer being so arranged as to lie radially inwardly of a foam rubber area of a relatively radially outer layer to prevent a sharp object from piercing more than one layer without contacting a pillar.

7. A shock-resistant, puncture-sealing tire comprising an outer tread and an inner wall, said inner wall including a plurality of layers of pillars, the spaces between said pillars being filled with cellular rubber, each pillar of a relatively radially inner layer being so arranged as to lie radially inwardly of a cellular rubber area of a relatively radially outer layer, the pillars of each layer being of increasing size as the layers progress inwardly.

8. In a puncture-sealing pneumatic tire, the improved combination which comprises a plurality of shock-resistant pillars integral with the inner wall, the spaces between said pillars containing a cellular rubber, each pillar of a relatively radially inner layer being so arranged as to lie radially inwardly of a cellular rubber area of a relatively radially outer layer.

9. In a puncture-sealing pneumatic tire, the improved combination which comprises a plurality of pyramid shaped rubber pillars integral with the inner wall, the spaces between said pillars being filled with foam rubber, each pillar of a relatively radially inner layer being so arranged as to lie radially inwardly of a foam rubber area of a relatively radially outer layer.

10. In a puncture-sealing pneumatic tire, the improved combination which comprises a plurality of round rubber pillars integral with the inner wall, the spaces between said pillars being filled with foam rubber, each pillar of a relatively radially inner layer being so arranged as to lie radially inwardly of a foam rubber area of a relatively radially outer layer.

MANFORD E. CHRISTENSEN.
WILLIAM J. HANSON.

REFERENCES CITED

The following references are of record in the file of this patent:

UNITED STATES PATENTS

| Number | Name | Date |
|---|---|---|
| 467,015 | Newkirk | Jan. 12, 1892 |
| 609,080 | Churchill | Aug. 16, 1898 |
| 666,401 | Whitney | Jan. 22, 1901 |
| 1,257,409 | Shaw | Feb. 26, 1918 |
| 1,440,553 | Privett | Jan. 2, 1923 |
| 1,874,197 | Lang | Aug. 30, 1932 |
| 2,018,189 | Prince | Oct. 22, 1935 |